Nov. 15, 1949     J. H. BRODIE     2,488,051
AIRCRAFT LANDING APPARATUS
Filed Jan. 15, 1948     3 Sheets-Sheet 1
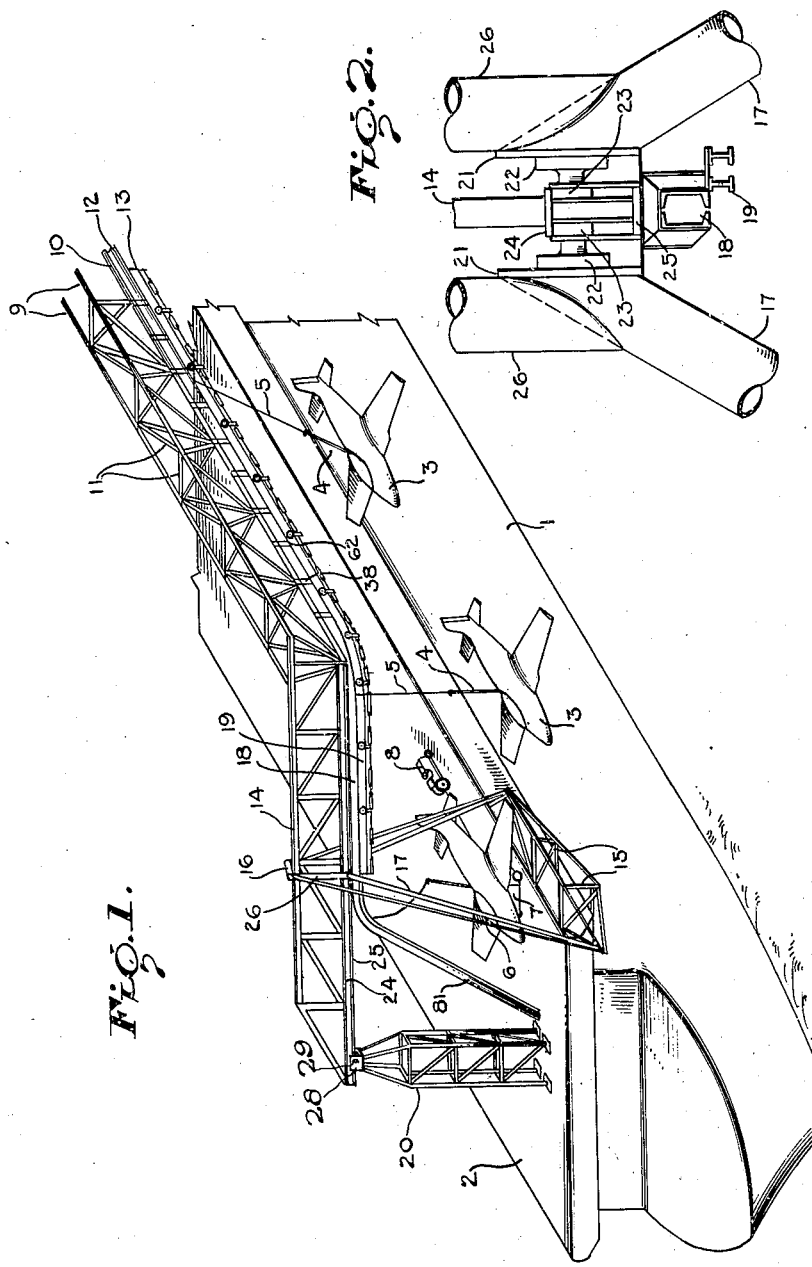
INVENTOR.
JAMES H. BRODIE.
BY
Cameron, Kerkam + Sutton.
Attorneys Nov. 15, 1949 J. H. BRODIE 2,488,051
AIRCRAFT LANDING APPARATUS
Filed Jan. 15, 1948 3 Sheets-Sheet 2
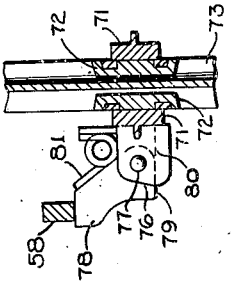
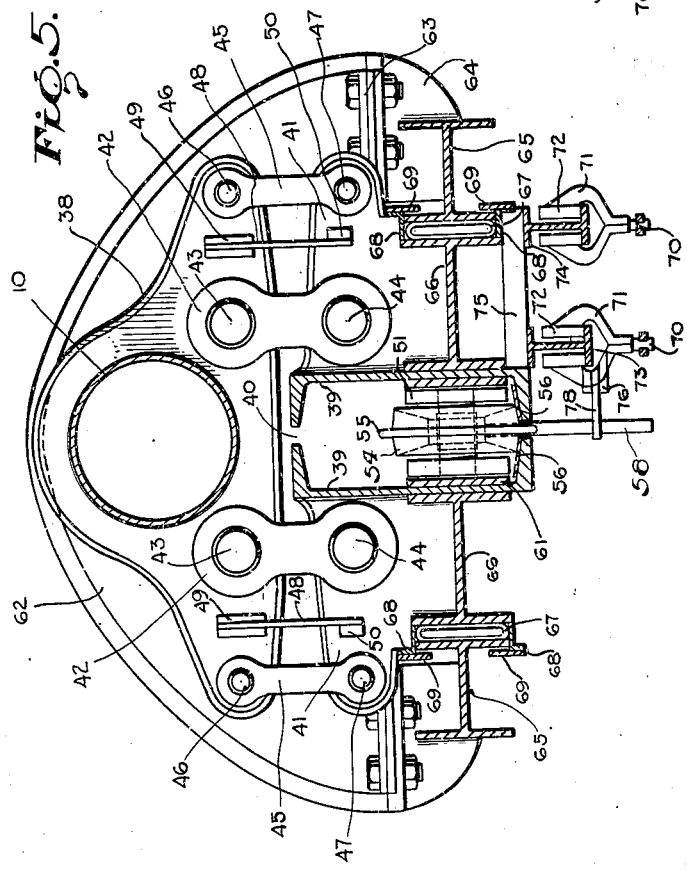
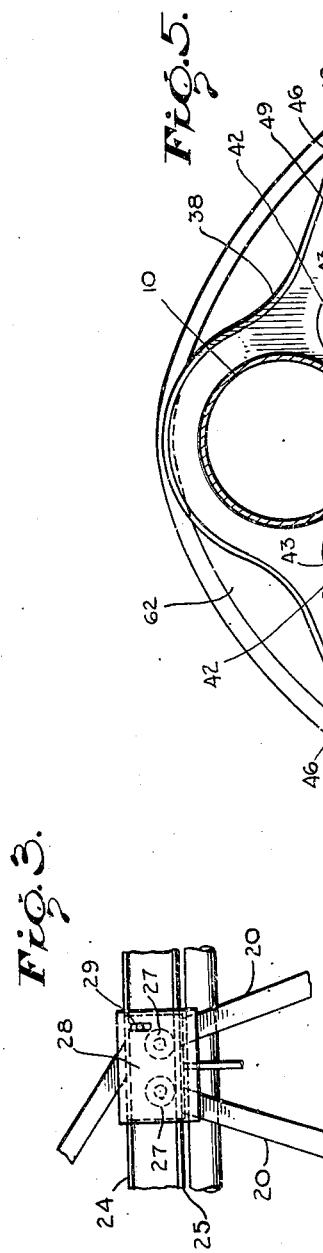
INVENTOR.
JAMES H. BRODIE
BY
Cameron, Kerkam + Sutton
Attorneys Nov. 15, 1949 J. H. BRODIE 2,488,051
AIRCRAFT LANDING APPARATUS
Filed Jan. 15, 1948 3 Sheets-Sheet 3

INVENTOR.
JAMES H. BRODIE
BY
Cameron, Kerkam+Sutton.
Attorneys

Patented Nov. 15, 1949

2,488,051

UNITED STATES PATENT OFFICE 2,488,051

AIRCRAFT LANDING APPARATUS

James H. Brodie, Baltimore, Md.

Application January 15, 1948, Serial No. 2,472

17 Claims. (Cl. 244—110)

This invention relates to the landing of aircraft on an elevated track or runway and is especially adapted to the recovery of aircraft on shipboard although in many respects it is applicable as well to landing aircraft on difficult terrain, in deep snow, etc. The invention is particularly suited to the recovery or landing of jet-propelled aircraft which are not equipped with the conventional wheel type landing gear, although it may be used for landing aircraft of any type of propulsion and with or without landing gear.

Since jet-propelled aircraft are not well suited to making stalled landings, provision must be made for substantial deceleration runs, and in the absence of landing wheels the aircraft must be supported during such runs by some other means of carriage. These factors lead to the use of a suspension landing system of the type disclosed in my prior Patent No. 2,435,197, issued February 3, 1948, which has demonstrated its utility in the case of relatively light-weight airplanes. However, substantially greater weights and landing speeds must be provided for in order to adapt this prior system to wider use. Moreover, for military purposes at least the apparatus should be capable of landing aircraft in succession at very frequent intervals so that landing, deceleration and removal of the aircraft from the landing apparatus must be accomplished in a minimum of time. These considerations are of special importance on board ship whether equipped with flight decks or not, and the invention will be described hereinafter with reference to aircraft carriers for purposes of example.

With the above ends in view, the present invention provides a rigid track structure extending substantially the entire length of the vessel in most cases and having a running carriage or trolley whereby the airplane is suspended and decelerated as it runs along the track. Such tracks should be supported far enough outboard from any obstructions along the sides of the vessel to allow the aircraft to make a safe approach and passage in flight under the track. Also the track should be supported at a substantial elevation above the flight deck of the vessel because on the one hand the aircraft must be suspended far enough below the track structure to prevent fouling during landing and deceleration, while on the other hand the line of flight of the aircraft during landing approach must be a safe distance above the water and also the aircraft should still be above flight deck level when it comes to a stop so as to facilitate subsequent handling.

Track installations conforming to the above requirements have the further advantages that substantially the entire flight deck of the vessel is left free and unobstructed, and that duplicate track structures may be provided on both sides of the vessel for simultaneous use. On the other hand, it is necessary with such installations to provide means for moving the aircraft inboard after it is brought to a stop at or near the forward end of the track. Still further, the track structure as a whole should be capable of retraction inboard of the vessel when not in use in order to diminish overhang when docking the vessel and to eliminate any possibility of elevated overhanging structure dipping into solid water under conditions of extreme roll and pitch in high seas.

The accompanying drawings show one embodiment of the invention which accomplishes the above objects and results, but it is to be understood that the drawings are for purposes of illustration only and are not to be taken as a definition of the limits of the invention, reference being had to the appended claims for the latter purpose.

In the drawings,

Fig. 1 is a perspective view of the forward end of a carrier or like vessel having a track structure embodying the invention along one side thereof;

Figs. 2, 3 and 4 are details showing how the track structure is supported.

Fig. 5 is a cross section through the track structure and showing the trolley;

Fig. 6 is a longitudinal section through the track and also showing the trolley; and Fig. 7 is a detail of conveyor mechanism for moving the trolley on the track.

Fig. 1 shows a track structure along one side only of the vessel 1, but it will be understood as stated above that a duplicate structure can be provided on the other side of the vessel. In conformity with the usual practice of heading the vessel into the wind and landing from the stern, the track terminates at the forward end of the vessel and only this end of the track and vessel is shown. For reasons stated above, the track structure is elevated substantially above the flight deck 2 of the vessel and is supported far enough outboard so that aircraft approaching the vessel to make a landing, or flying under the track in the case of a missed landing, may have a free and unobstructed flight path.

It will be understood that landing aircraft such as shown at 3 in Fig. 1 are provided with suitable hooks 4 adapted to engage suspension slings 5 or the like as in the system disclosed in my prior patent mentioned above. These slings are suspended from trolleys one of which is described hereinafter and the aircraft are decelerated during the forward run of these trolleys along the track structure to the forward end of the vessel. Fig. 1 shows two successive positions of such an aircraft moving along the track, the aircraft in its foremost position having been brought to a stop but being not yet completely decelerated in its preceding position. As each aircraft comes to a stop at or near the forward end of the track, its trolley is moved ahead to the end of the track and then inboard on a transverse extension of the track, each aircraft being then lowered as shown at 6 on to a dolly 7 on the flight deck and hauled away to stowage by a tractor 8.

The track structure along the side of the vessel comprises a suitable truss framework which in the form shown comprises upper parallel longitudinal members 9 and a lower main longitudinal member 10 interconnected by suitable framework 11. The longitudinal members and connecting framework may suitably be formed of hollow metal tubing welded together to provide an integral structure. As described in greater detail hereinafter, the lower main longitudinal member 10 carries the trolley track per se and also a conveyor chain track which are indicated generally at 12 and 13 respectively.

The longitudinal track structure is supported in its elevated outboard position by a suitable number of transverse cantilever trusses carried by vertical supports that are preferably mounted outboard of the edge of the flight deck so as to leave its entire area free and unobstructed. Fig. 1 shows the foremost truss 14, and framing 15 at the side of the vessel for mounting the vertical support 16 for this truss outboard of the flight deck. This forward support 16 is preferably of the A-frame type so as to provide room between the legs 17 thereof for the aircraft to move inboard, the forward truss 14 carrying the above mentioned inboard extensions 18 and 19 of the trolley track 12 and conveyor track 13. In view of this track extension, the truss 14 preferably extends inboard to the center line of the vessel where its inner end is supported on a suitable tower 20. However, the other cantilever trusses throughout the length of the vessel need not extend inboard beyond their vertical supports and these supports need not be of the A-frame type, although they are preferably mounted outboard of the edge of the flight deck on framing such as 15.

In order to provide for retraction of the track structure inboard of the vessel, the transverse cantilever trusses are mounted slidably on their respective vertical supports. Fig. 2 illustrates a suitable mounting for the forward truss 14 in its A-frame 16. The legs 17 of the A-frame carry spaced parallel plates 21 at their upper ends which support bearings 22 of rollers 23. The lower chord of the truss 14 comprises a fabricated structure of I-beam shape, the rollers 23 engaging and supporting the underneath surfaces of the upper flanges of the top member 24, while the lower member 25 carries the inboard track extension 18 and the conveyor track extension 19 mentioned above and described in greater detail hereinafter. The legs 17 of the A-frame are extended vertically on either side of the truss 14 by vertical members 26 which are cross-connected over the top of the truss.

The inner end of the truss 14 is also slidably supported at the top of the tower 20, preferably by means of rollers. A suitable construction is illustrated in Fig. 3. The top of the tower 20 carries rollers 27 which bear downwardly on the upper flanges of the lower member 25 so as to hold this end of the truss 14 against upward movement due to the weight of the track structure at the outer end of the truss. The truss may be locked in position by means of a side plate 28 and a pin 29 extending through the plate and into the web joining the members 24 and 25 of the truss.

Fig. 4 illustrates the slidable mounting of one of the intermediate cantilever trusses 30 on its vertical support. As noted above, the vertical supports for these intermediate trusses need not be of the A-frame type, and as shown in Fig. 4 they may comprise uprights 31 connected by bracing 32 and also by a top frame 33. The lower chord member 34 of the truss may suitably be of I-beam shape as in the case of the truss 14. A set of rollers 35 at the outer side of the vertical support frame engages and supports the bottom flanges of the chord member 34, and a set of rollers 36 at the other side of the support frame bears downwardly against the lower flanges of the chord member 34. As stated above, the intermediate trusses preferably do not extend inboard beyond their vertical supports and as shown in Fig. 4 the rollers 35 and 36 are at the inner end of the truss when the track occupies its operating position. Additional locking pins 37 may be provided at the intermediate trusses if desired.

The details of the track itself and its support from the framing 9, 10 and 11 are shown in Figs. 5 and 6. Track support brackets 38 are secured at spaced intervals to the lower main longitudinal member 10 of the framework, these brackets being preferably of hollow built-up construction as shown in Fig. 6. The track itself comprises a pair of longitudinally extending channel members 39 which face each other with their opposed flanges normally spaced somewhat as shown at 40. These channels extend longitudinally substantially the entire length of the vessel and provide a hollow track for the trolley described hereinafter. At the forward end of the vessel, the channels 39 are curved through a 90° angle and continued inboard at 18 as described above.

The channels 39 are suspended from the brackets 38 in such a way that they can be moved toward and away from another for the purpose of braking and decelerating the trolley as described hereinafter. To this end channel brackets 41 extend outwardly from each channel at longitudinally spaced points corresponding to the brackets 38, and each channel bracket 41 is suspended from its corresponding bracket 38 by means of a parallel linkage. In the form shown, the track is carried by main links 42 pivoted at 43 to the supporting bracket 38 and at 44 to the channel brackets 41. The parallel linkages are completed by secondary links 45 pivoted at 46 to the supporting bracket 38 and at 47 to the channel brackets 41. The channels are normally maintained in spaced relation by suitable resilient means such as leaf springs 48 one end of which is secured at 49 to the supporting bracket 38 and the other end of which is engaged by a lug 50 on the channel brackets 41. These springs 48 may flex to permit the channels 39 to approach one another as described hereinafter.

The trolley comprises a hollow box-like structure 51 having flat vertical sides parallel to the vertical webs of the channels 39 and interconnected by webs 52. Bearings 53 at the ends of the box 51 serve to carry trolley wheels 54 which, as seen in Fig. 5, are beveled to roll on the lower flanges of the channels 39 and are preferably provided with a central guide flange 55 which runs in the space 40 between these flanges. The flanges may be provided with hardened wear plates 56 if desired. A pivot pin 57 at the center of the trolley carries a suspension link or arm 58 which depends from the trolley through the space 40 and carries a shackle 59 and sling 60 at its lower end whereby the airplane is suspended from the trolley. Deceleration of the trolley as it runs along the track is provided by moving the channels 39 toward one another and into frictional engagement with the sides of the trolley. The inner faces of the channel webs may be provided with wear plates 61 for this purpose.

In order to apply the braking force to the channels uniformly throughout their length, it is preferred to urge them toward one another by means of tubular elements which extend longitudinally with the channels and are expansible under internal pressure which may be hydraulic, pneumatic, etc. Hence suitable longitudinal backing supports are carried by the track structure framework on the outer sides of the channels and said expansible tubular members are interposed between these backing supports and the channels themselves. In the form shown, a plurality of backing support brackets 62 are secured at spaced intervals to the lower main longitudinal member 10 intermediate the channel support brackets 38. The brackets 62 are flanged and bolted at 63 to plates 64 carrying longitudinal backing supports 65 which, as shown, are of H-shape with horizontal webs and vertical flanges. Similar H-shaped members 66 are secured to the outer faces of the channels 39, and expansible tubes 67 are interposed between the adjacent vertical flanges of the members 65 and 66.

The housings for the tubes are completed by top and bottom plates 68 at the upper and lower edges of the members 66, the members 65 being slidable between the plates 68.

Hence when tubes 67 are expanded, the members 65 being fixed, the members 66 and plates 68 are urged inwardly to urge the channels 39 together with parallel motion due to the links 42, 43 and the wear plates 61 are thus brought into frictional engagement with the sides of the trolley. Inward movement of the channels may be suitably limited as by means of stops 69 secured to the outer edges of the plates 68 and overlapping the members 65. The inward movement of the channels toward one another is also accompanied by flexure of the springs 48 so that when the pressure in the tubes 67 is relieved, these springs move the channels 39 apart to their normally spaced position.

As the trolley is brought almost to a stop at or near the forward end of the track 39, it is engaged automatically by suitable conveyor means and moved forwardly on the track to its end and around the corner into the inboard track extension 18. In the form shown (Figs. 5 and 7) this conveyor means comprises a chain 70 certain links of which carry brackets 71 and rollers 72 which run on the flanges of an I-beam track 73. It will be understood that the chain 70 is preferably endless, the return path of the chain comprising a second I-beam track 74. The chain tracks 73, 74 follow the channels 39 to their forward end and around the corner, being continued inboard at 19 as described above.

The I-beams 73, 74 may be supported on the track structure in any suitable manner. In the form shown, bar brackets 75 are secured at intervals to one of the channels 39 and to the adjacent plate 68, and the I-beams 74 are carried by these bar brackets. The chain brackets 71 are provided with dogs or like projections which extend into the path of the trolley suspension arms 58 as shown in Fig. 7 and are thus adapted to engage these arms and move the trolleys ahead on the track as described above. Preferably, however, these dogs are arranged to permit overrunning of a trolley in case it is moving faster than the chain. As shown in Fig. 7, lugs 76 extend laterally from the bracket 71 and provide a pivot 77 for a dog 78. In the position shown in Fig. 7, this dog engages and pushes ahead the trolley suspension arm 58, the dog being prevented from rotation by engagement of its rear edge 79 with a stop 80 bridging the lugs 76. However, should a trolley suspension arm 58 overtake one of the dogs 78, the dog can swing about its pivot 77 in a clockwise direction against the action of a spring 81 to permit the trolley to overrun.

The operation of the apparatus will be understood from the foregoing description. Briefly summarized, the landing aircraft approaches the after end of the track with its hook 4 extended to engage the sling 5 of a trolley. After engagement, the aircraft may swing forwardly and upwardly on its sling as the trolley is being accelerated to a position such as shown in the case of the rearmost aircraft in Fig. 1. The trolley and suspended aircraft then moves down the track, being decelerated during the run by the braking action of the channels 39 on the trolley as described above and being eventually brought to a stop at or near the end of the track. The aircraft then hangs vertically from the trolley as shown in the case of the foremost aircraft in Fig. 1. Each trolley is then moved forwardly by the conveyor to the end of the track and around the corner into the inboard track extension, the inboard end of which may be downwardly inclined as shown at 81 in Fig. 1 so that the trolley runs down the incline to lower the aircraft onto the waiting dolly 7 for hauling away on the flight deck.

A rapid succession of landings can thus be handled with properly trained personnel. The capacity can be doubled by another track installation on the other side of the vessel. The track is elevated sufficiently to permit approaches to be made at approximate flight deck level, and if the sling is missed the aircraft has a free and unobstructed flight path under the track. Also the forward end of the track may be elevated somewhat higher than the rear end if desired. Meanwhile the flight deck itself is unobstructed except at its very forward end. When the track is not in use, on the other hand, the track structure can be retracted inboard of the vessel where it offers little or no hindrance to navigation of the vessel.

While only one embodiment of the invention has been described and illustrated in the drawings, it will be understood that this embodiment is by way of example and that the invention is not restricted thereto, being susceptible of other embodiments and various changes in the form, details of construction and arrangement of the parts which will occur to those skilled in the art.

Reference should therefore be had to the appended claims for a definition of the limits of the invention.

What is claimed is:

1. Apparatus for landing aircraft on shipboard comprising a vessel, a rigid track structure extending along one side of the vessel in an outboard position and having trolley means adapted to support an aircraft during a deceleration run along said track, vertical track supports spaced along the side of the vessel and extending above its deck, and transverse track supports extending inboard from the track structure to said vertical supports, each transverse support being slidable transversely of the vessel on its vertical support whereby said track structure may be extracted inboard of the vessel when not in use.

2. Apparatus as defined in claim 1, said vertical supports being mounted at the sides of the vessel outboard of its deck.

3. Apparatus as defined in claim 1 including rollers mounted on said vertical supports and engaging said transverse supports.

4. Apparatus as defined in claim 3, said vertical supports being provided with two transversely spaced sets of rollers for each transverse support, the transverse support resting on the outer set of rollers and bearing upwardly against the inner set.

5. Apparatus as defined in claim 1, the transverse support at the forward end of said track extending inboard over the deck of the vessel, and a transverse inboard extension of said track carried by said forward support.

6. Apparatus as defined in claim 1, including conveyor means movable along the track at its forward end and adapted to engage said trolley means for positively moving the same to the forward end of said track.

7. Apparatus as defined in claim 6, said conveyor means having projections extending into the path of and adapted to engage said trolley means, said projections being movable relative to the conveyor means in one direction to allow said trolley means to overrun the conveyor means.

8. Apparatus as defined in claim 1, said track having at its forward end a transverse inboard extension over the deck of the vessel, and conveyor means movable along the forward end of the track and along said inboard extension, said conveyor means being adapted to engage said trolley means for positively moving the same to said forward end and inboard over the deck.

9. Apparatus as defined in claim 8, said inboard track extension having a downwardly inclined terminal portion whereby aircraft suspended from the trolley means may be lowered to the deck.

10. Apparatus of the class described comprising a rigid track structure supported in an elevated position and comprising a pair of longitudinal facing channels with their opposed flanges closely spaced to form a hollow track, trolley means running in said hollow track, and aircraft suspending means depending from said trolley means through the space between the lower opposed flanges of said channels, said trolley means having a wheel rolling on said lower opposed flanges and said wheel having a central flange projecting between said lower opposed flanges.

11. Apparatus of the class described comprising a rigid track structure supported in an elevated position and comprising a pair of longitudinal facing channels with their opposed flanges closely spaced to form a hollow track, trolley means running in said hollow track, and aircraft suspending means depending from said trolley means through the space between the lower opposed flanges of said channels, said channels being mounted on said structure for movement toward each other into frictional engagement with trolley means, and means for moving said channels toward one another to decelerate said trolley means as it moves along the track.

12. Apparatus as defined in claim 11 including track supports spaced longitudinally along said structure and parallel linkage means for suspending said tracks from said supports for movement toward and away from each other.

13. Apparatus as defined in claim 11, said means for moving said channels toward one another comprising tubular members expansible under internal pressure, and fixed backing supports carried by said structure, said expansible members being interposed between said backing supports and said channels.

14. Apparatus as defined in claim 13, including spring means urging said channels apart to normally spaced positions.

15. An elevated track structure having trolley means running thereon for suspending an aircraft during its deceleration run, said structure comprising a supporting framework having a lower main longitudinal member, transverse supporting brackets spaced along and secured to said member, a pair of longitudinal facing channels below said brackets with their opposed channels closely spaced to form a hollow track for said trolley means, transverse brackets extending outwardly from each channel at longitudinally spaced points corresponding to said supporting brackets, parallel links connecting each channel bracket with its supporting bracket, leaf springs extending between said channel brackets and supporting brackets to maintain said channels in normally spaced relation, and means for moving said channels toward one another against said springs to engage and decelerate said trolley means as it runs in said track.

16. An elevated track structure having trolley means running thereon for suspending an aircraft during its deceleration run, said structure comprising a supporting framework having a lower main longitudinal member, transverse supporting brackets spaced along and secured to said member, a pair of longitudinal facing channels below said brackets with their opposed channels closely spaced to form a hollow track for said trolley means, transverse brackets extending outwardly from each channel at longitudinally spaced points corresponding to said supporting brackets, parallel links connecting each channel bracket with its supporting bracket, leaf springs extending between said channel brackets and supporting brackets to maintain said channels in normally spaced relation, and means for moving said channels toward one another against said springs to engage and decelerate said trolley means as it runs in said track, said trolley means having flat sides parallel to the webs of the channels for frictional engagement therewith.

17. An elevated track structure having trolley means running thereon for suspending an aircraft during its deceleration run, said structure comprising a supporting framework having a lower main longitudinal member, transverse supporting brackets spaced along and secured to said member, a pair of longitudinal facing channels below said brackets with their opposed channels closely spaced to form a hollow track for said trolley means, transverse brackets extending outwardly from each channel at longitudinally spaced points corresponding to said supporting brackets, parallel links connecting each channel bracket with its supporting bracket, leaf springs extending between said channel brackets and supporting brackets to maintain said channels in normally spaced relation, and means for moving said channels toward one another against said springs to engage and decelerate said trolley means as it runs in said track comprising fixed backing supports carried by said main longitudinal member and extending longitudinally parallel to and outwardly of said channels, and tubular members expansible under internal pressure and extending longitudinally between said backing supports and channels for moving said channels toward one another against said springs to engage said trolley means.

JAMES H. BRODIE.

REFERENCES CITED

The following references are of record in the file of this patent:

UNITED STATES PATENTS

| Number | Name | Date |
|---|---|---|
| 1,836,010 | Audrain | Dec. 15, 1931 |
| 1,997,945 | Olaszy | Apr. 16, 1935 |
| 2,390,745 | Valdene | Dec. 11, 1945 |